Figure 1:
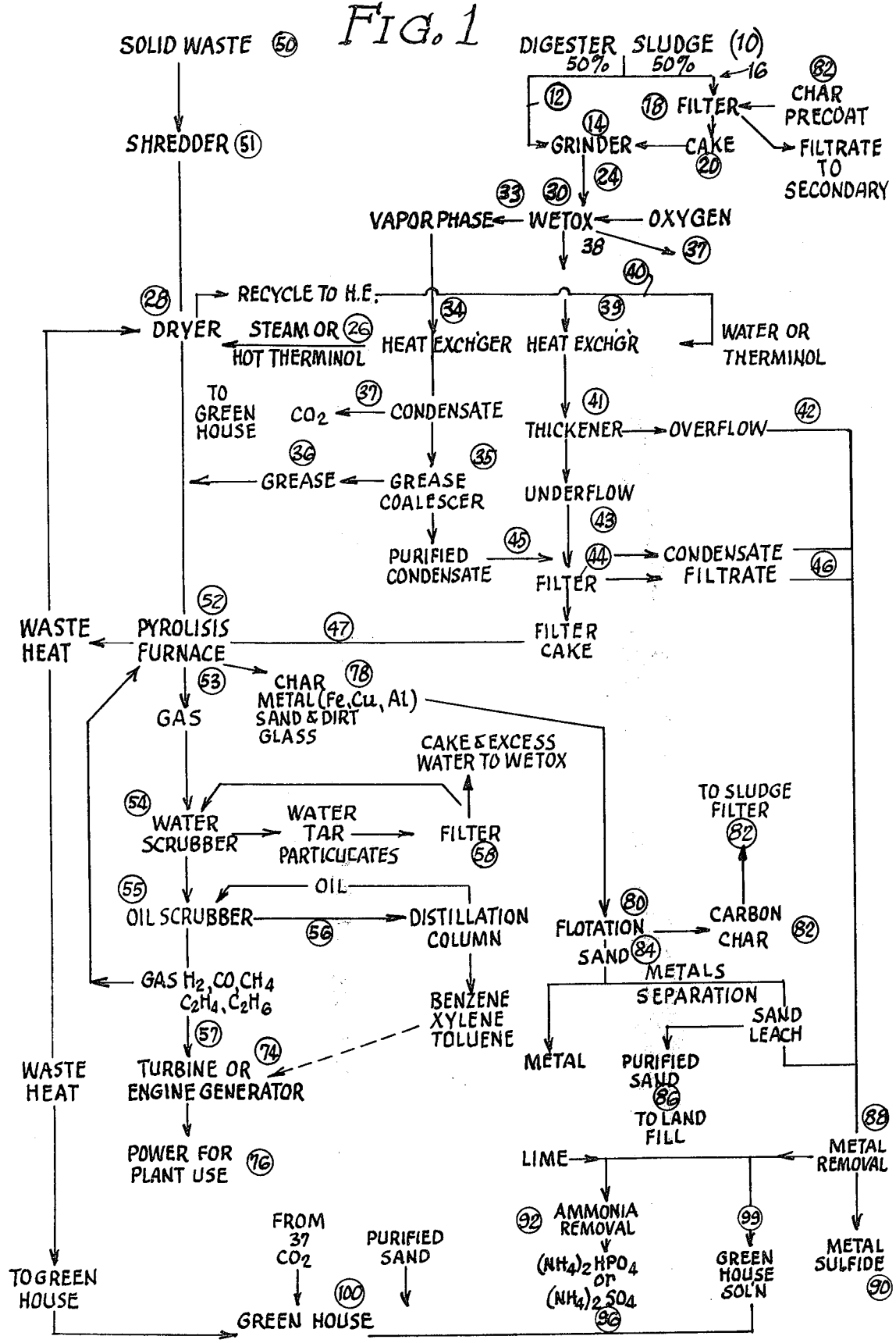

United States Patent [19]

Fassell

[11] 4,010,098
[45] Mar. 1, 1977

[54] RESOURCE RECOVERY FROM DISPOSAL OF SOLID WASTE AND SEWAGE SLUDGE

[75] Inventor: Wayne Martin Fassell, Newport Beach, Calif.

[73] Assignee: Barber-Colman Company, Rockford, Ill.

[22] Filed: May 29, 1975

[21] Appl. No.: 581,903

[52] U.S. Cl. .................................. 210/10; 71/12; 210/42 R; 210/63 R; 210/67; 210/68; 210/73 S; 423/340

[51] Int. Cl.² .......................................... C02B 3/08

[58] Field of Search ................................ 71/12–14, 71/47, 53, 63; 110/7 R, 8 E; 210/10, 18, 42, 53, 56, 63, 66–68, 70, 71, 152, 167, 73 S; 423/305, 340

[56] References Cited

UNITED STATES PATENTS

| 2,952,516 | 9/1960 | Gross ................................ 423/340 |
| 3,050,383 | 8/1962 | Wilson ................................ 71/11 |
| 3,342,731 | 9/1967 | Baumann et al. .................... 210/67 |
| 3,549,010 | 12/1970 | Marsh et al. ................... 210/73 SG |
| 3,549,529 | 12/1970 | Wiseman .............................. 210/63 |
| 3,652,405 | 3/1972 | Hess et al. ........................... 210/10 |
| 3,740,331 | 6/1973 | Anderson et al. .................... 210/53 |
| 3,741,890 | 6/1973 | Smith et al. ................... 210/73 SG |
| 3,770,419 | 11/1973 | Brown et al. ....................... 110/8 E |
| 3,859,933 | 1/1975 | Vonklenck ........................... 210/63 |
| 3,870,631 | 3/1975 | Fassell et al. ....................... 210/63 |

Primary Examiner—Frank A. Spear, Jr.
Assistant Examiner—Peter A. Hruskoci
Attorney, Agent, or Firm—McDougall, Hersh & Scott

[57] ABSTRACT

The treatment of solid waste and sewage sludge with the recovery of natural resources comprising subjecting all or at least a portion of the sewage sludge to wet oxidation reaction to reduce the COD by an amount of at least 50% and preferably 50–85% and using the excess heat from the wet oxidation reaction to dry the solid waste and subjecting the combined solids from the wet oxidation reaction and the solid waste to pyrolysis under non-oxidizing conditions whereby the products from the pyrolysis reaction are readily separable into valuable constituents which are easily recovered.

23 Claims, 3 Drawing Figures

RESOURCE RECOVERY FROM DISPOSAL OF SOLID WASTE AND SEWAGE SLUDGE

This invention relates to a resource recovery system for the disposal of sludge and solid waste and it relates more particularly to a system of the type described wherein valuable components, including energy, are recovered as products or byproducts for utilization in carrying out the disposal of sludge and waste and for use in the fabrication and sale of materials having commercial value thereby to enhance the self-sufficiency of the system from the standpoint of energy and cost.

To the present, municipalities are faced with the high cost of sewage sludge disposal from primary sludge separation, aerobic or anaerobic biological processes. Various processes have been used for sludge disposal, including land fill, ocean dumping, composting, heat treatment, incineration and wet oxidation. Cost of disposal ranges from $5.00 to $100.00 per ton depending upon the process used and the local conditions. All processes, as currently practiced, have certain environmentally unacceptable problems or use excessive amounts of energy.

Further, such sludge disposal processes are limited to treatment of organic substances thereby to require separation of solid waste from sludge before treatment, which still leaves the problem of solid waste disposal.

Currently, large scale investigations are being conducted toward the disposal of solid waste and sewage sludge by combustion. This requires collection of waste and sludge to make sufficient quantities available to justify the construction and operation of large scale drying and combustion facilities. Such combustion processes leave a residue which, having been oxidized enmass during forced combustion, offers little possibility of recovery of components of commercial value but instead raises problems of disposal of the ash and pollution of the atmosphere by the combustion products of said process.

It is an object of this invention to provide a system in which (1) sewage sludge and solid waste can be processed in a single facility for disposal while recovering resources originally present in the sewage sludge and solid waste, such as energy, metallic components and commercially valuable combustible byproducts; (2) in which the system is substantially self-sufficient from the standpoint of energy requirements and is productive from the standpoint of heat and power generation; (3) in which utilization can be made of various materials obtained as byproducts to facilitate various of the processing steps used in the system, and (4) in which the processes in the system can be combined in a manner to maximize the efficiencies of the processing steps and the handling of material employed therein.

Figure 2:
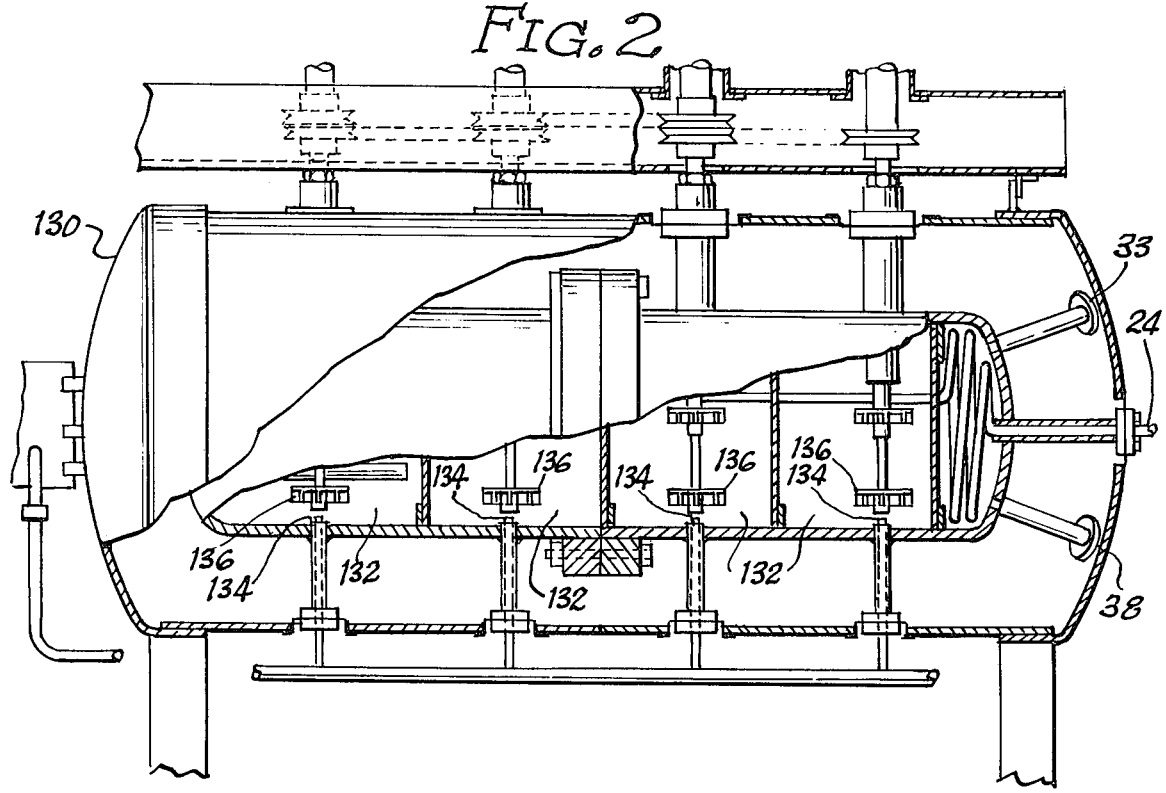
Figure 3:
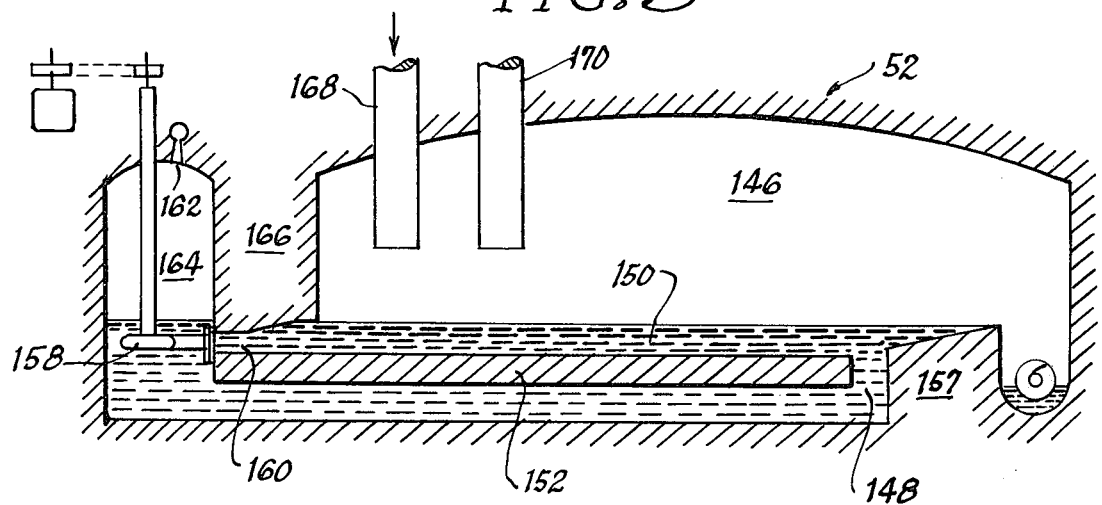

These and other objects and advantages of this invention will hereinafter appear and for purposes of illustration, but not of limitation, an embodiment of the invention is shown in the accompanying drawings in which FIG. 1 is a flow diagram of a typical system embodying the features of this invention for the disposal of municipal sludge and solid waste;

FIG. 2 is a schematic sectional elevational view of a wet oxidation reactor of the type which may be employed in the practice of this invention; and FIG. 3 is a schematic sectional elevational view of a pyrolysis device for the treatment and transport of solid waste.

Before proceeding with a detailed description for the treatment of municipal waste and sewage sludge in accordance with the practice of this invention, as outlined in the accompanying flow diagram of FIG. 1, the invention will be briefly described with respect to its basic concepts and the combination of elements and steps employed therein.

The invention makes use of a reactor for the wet oxidation of sewage sludge and a pyrolysis unit wherein the solid waste and organic solids from the wet oxidation reactor are subjected to thermal degradation in a non-oxidizing atmosphere.

Part of the sewage sludge, with or without previous digestive treatments with microorganisms, such as aerobic bacteria in an activated sludge process, or anaerobic bacteria in a sludge digester process, is fed to the wet oxidation reactor wherein combustion of organic matter is achieved under elevated temperature and pressure conditions with the introduction of oxygen containing gas, such as air, or oxygen accompanied with vigorous agitation. It is sufficient if the COD (chemical oxygen demand) of the sludge is reduced by as little as 10% or as much as 85–95%, but it is preferred to subject the sludge to oxidation by reaction of the COD to an amount within the range of 50–85% and preferably to an amount within the range of 70–85% to maximize the excess thermal energy available for drying of solid waste.

The wet oxidation of organic matter dissolved or suspended in the aqueous medium is an exothermic reaction which makes large amounts of heat available. Such heat finds utilization in a self-sufficient process for the removal of water and drying of the solid waste which is fed directly to the pyrolysis unit.

With the use of oxygen for wet oxidation of sewage sludge pre-concentrated as shown in FIG. 1, the sludge fed to the WETOX (wet oxidation) reactor does not require pre-heating. At sludge concentrations containing over 8% solids, the system is autogenetic in this mode of operation. This avoids the necessity of a costly tube-in-tube heat exchange and completely avoids the problems of scaling and plugging often encountered in heat treatment and wet oxidation heat exchangers for treatment of sewage sludge.

The pyrolysis unit may be a conventional retort but it is preferred to make use, in the practice of this invention, of a pyrolysis unit in the form of a trough filled with molten lead that is recirculated about a submerged septum to provide an upper stratum which flows continuously in one direction from the head end to the foot end of the trough. The solid waste and the separated organic solids from the wet oxidation reaction are fed onto the surface of the molten lead bath for transport from the head end to the foot end after which the solids remaining on the surface of the molten lead bath are swept over a dam for separation from the molten lead carrier. During transport, the waste and sludge are raised to elevated temperature by the molten lead bath to bring about thermal degradation of organic components whereby such organic components are converted to gaseous products such as $H_2$, $CO_2$, CO, $CH_4$ and the like gases, and vapors such as vapors of water, volatile organics such as benzene, xylene and toluene and the like, while the carbonaceous material is reduced to a carbonaceous char in the absence of oxidizing conditions within the pyrolysis chamber.

In the absence of oxidizing conditions within the pyrolysis unit, the metallic components of the waste remain in a state of relatively pure metal to enable recovery as materials having commercial value. The carbonaceous char finds beneficial use in various chemical and unit operations such as a filter aid, and the like.

The combination of the wet oxidation and the pyrolysis enables resource recovery to be carried out in the most expedient and efficient manner, utilizing the benefits of one to influence operation of the other whereby a unit operation is achieved which embodies simplified steps that are easily carried out with readily available equipment for the disposal of solid waste and sewage sludge in an economical manner with the recovery of valuable components and energy.

A more detailed description of the invention will now be made with reference to the flow diagram representing a typical utilization in the treatment of municipal sewage and waste.

Municipalities are faced with the problem of disposal of solid waste and sewage sludge. The latter includes much of the organic matter in the form of garbage, toilet waste and the like composed mostly of paper and other organic material. Solid waste collected by a municipality includes metal, plastics and glass containers, ceramics, rubber, plastic and metal parts and waste, and paper and other organic, inorganic, metallic and ceramic materials.

The sewage sludge is treated, all or a part, separate from the solid waste along the pathway which includes the wet oxidation reactor. This sewage sludge is usually present in solution, dispersion or in admixture with water. The sewage sludge can be the result of primary sedimentation or microbiological sludge-forming processes, such as to aerobic bacteria in the activated sludge process or anaerobic bacteria in the sludge digester process.

The process of the flow sheet starts with a digester sludge 10 but it will be understood that sludge other than activated sludge or digester sludge can be used as the starting material in the wet oxidation phase of the process of this invention.

The digester sludge 10 is divided into two fractions with one fraction being advanced through line 12 to grinders 14 for reducing the organics to finely divided form for solution and suspension in the aqueous medium. The other fraction is advanced along line 16 to a filter section 18 with the filtrate recirculated to secondary microbiological treatment.

The carbonaceous char 82, obtained from the pyrolysis system, is used to precoat filter 18 to enhance the dewatering of part of sludge 10. The precoated filter 18 is operated in the conventional mode with the doctor blade advancing slightly with each revolution of the filter drum.

The filter cake 20, containing the char, is joined with the portion of the digester sludge by-passed about the filter for introduction into the grinder 14 which reduces the solids to finely divided form for suspension or solution in the aqueous medium. The effluent from the grinder is fed to the reactor 30 wherein the aqueous feed containing combustible organic material is subjected to wet oxidation.

Suitable reactors are described in the Zimmermann U.S. Pat. Nos. 2,665,249, 2,824,858, 2,903,425, 2,932,613, and 3,442,798, or the Schoeffel Pat. No. 3,060,118, but it is preferred to make use of a reactor of the type described in applicant's U.S. Pat. No. 3,852,192, which is illustrated schematically in FIG. 2 of the drawings.

Briefly described, the organic medium containing the combustible organic material in solution or suspension, in an amount within the range of 2-2% by weight, is continuously introduced through line 24 into the end of a horizontally disposed, compartmentalized reaction chamber 130, as shown in FIG. 2, partially to fill the chambers 132 in a manner to provide a lower liquid phase and an upper gaseous phase within each compartment. An oxygen containing gas, such as air or oxygen, is introduced into each of the reaction chambers through inlets 134 located in the immediate vicinity of turbo-type stirrers 136 rotated at high speeds rapidly to distribute the oxygen in finely divided form through the liquid phase to enhance a nucleated oxidation reaction with the dissolved or suspended organic material. Oxygen is the preferred oxidant and may be added either in liquid or gaseous form. Combustion of organic material by oxidation under wet conditions takes place at elevated temperature and pressure at a rate which is somewhat dependent upon the temperature, pressure, the amount of combustible organic material and the presence of oxygen in relation with organic combustible material. As described in the Gitchel U.S. Pat. No. 3,272,740, mid-oxidation for COD reduction by 5-45% is achieved under temperature and pressure conditions which range from 150° C at 300 psi to 300° C at 1000 psi, while the conditions for substantially complete oxidation of organic matter can be achieved at higher temperatures and pressures of 300°-450° C and 300 to 3000 psi. Reference can be made to the Fassell et al. U.S. Pat. No. 3,870,631 for the more favorable conditions of 200°-250° C at 500-700 psi for wet oxidation using the horizontal reactor of the type described.

In the system forming the subject matter of this invention, it is preferred to achieve the maximum degree of oxidation to produce the greatest excess of thermal energy for use elsewhere in the system and avoid the necessity of a costly tube-in-tube heat exchange for the pre-heating of the incoming sludge. Under these conditions, the sludge has been reduced to an odorless, rapidly settling form that can be easily processed for the removal of water by filtration. sufficient heat has been made available by the combustion of organic matter to make the wet oxidation reaction self-sufficient and to provide excess heat which may be used in the removal of moisture and drying solid waste components of the process. Thus, the effect of the oxidation reaction is the generation of heat with the corresponding production of hot gases and vapors which are vented from the reactor through outlet 33 and utilized by heat exchange to reheat the water or other heat transfer media such as therminol to an elevated temperature for use in drying solid waste. Steam, hot water or hot heat transfer fluids are transferred through line 26 to the dryer 28. The vapor phase condensate, which is removed through line 33 from the reactor via the heat exchanger 34, contains a grease phase which may be separated from the aqueous phase by a coalescer 35 for passage directly through line 36 to the pyrolysis unit. the $CO_2$ produced during the wet oxidation of the organic matter present in the sewage sludge is conducted via line 37 for $CO_2$ enrichment of the atmosphere within a greenhouse or horticulture growth chamber. This leaves an aqueous slurry containing any residual organic solids, inorganic solids present in or formed as a result of chemical reactions of the sewage sludge and soluble constituents such as acetic acid, propionic acid, ammonia salts and the like, which is advanced from the reactor 30 through line 38. The aqueous slurry is conducted via heat exchanger 39 for recovery of its sensible heat by circulating heat transfer fluid in line 40 for use elsewhere in the process. Initial separation of the solids and liquid phase is made in thickener 41.

The clarified overflow of the thickener is conducted through line 42 to the metal removal circuit while the thickened slurry from the thickener underflow is conducted to filter 44 through line 43. The purified condensate from the grease coalescer 35 is conducted through line 45 and the filtrate from filter 44 is conducted through line 46 to the metal removal section. The separated filter cake is advanced along line 47 directly to the pyrolysis unit. This insures the final destruction of any remaining organics, renders any valuable metals more soluble by virtue of the reducing conditions present during pyrolysis.

The solid waste portion 50 is first processed through a shredder 51 to reduce the solid waste to a form suitable for subsequent processing. The shredded waste is subjected to drying for the removal of water. The dryer 28 can be of a mode to operate as a tunnel dryer, kiln dryer, rotary dryer or other preferably continuous drying system in which use is made of the heat and hot gases made available from the companion wet oxidation reactor, pyrolysis furnace and turbine or internal combustion engine generator system 74. Usually, the preparation of sewage sludge processed through the wet oxidation cycle is balanced with the character and amount of material making up the solid waste generated in a community. The heat energy derived from the wet oxidation can be supplemented by heat generated or made available from other phases of the process, as will hereinafter be described.

The pyrolysis unit 52 is another focal point of the system. As described, any suitable retort can be employed but particular benefit in resource recovery and efficiency of operation, in combination with the wet oxidation cycle, is achieved when use is made of a conveyor in which pyrolysis of the conveyed material is achieved during transport, as described in my copending application Ser. No. 581,902 filed concurrently herewith and entitled "Treatment During Transport of Solid Waste". The preferred pyrolysis unit, illustrated in FIG. 3 of the drawings, comprises an elongate chamber 146 having a trough 148 or sump filled with molten lead 150, with a submerged septum 152 dividing the lead bath into an upper portion and a lower portion joined at their ends to enable continuous recirculation forwardly over the top from the head end 154 to a dam 157 at the foot end and back under the bottom with the circulation being created by submerged pump 158 which operates to displace molten lead from the back at the bottom through a weir 160 at the top. An equally applicable process is described by Brown under U.S. Pat. No. 3,770,419.

Heaters 162 are provided in a combustion chamber 164, separated from the pyrolysis chamber 146 by a wall 166 which extends downwardly to below the level of the lead bath, to maintain the molten lead at the desired temperature, such as at a temperature within the range of 1166°–1600° F and preferably 1325°–1450° F. The dried solid waste and filter cake from the wet oxidation reactor are introduced into the pyrolysis chamber through one or more feed openings 168 across the width of the bath adjacent the head end.

Under the non-oxidizing conditions maintained in the atmosphere within the pyrolysis chamber, thermal reduction of organic matter takes place during transport of the solid waste and sewage by the lead bath whereby organic material is rapidly reduced to gases, vapors and char. Metals and inorganic materials contained in the feed will remain relatively unreacted under the conditions existing within the pyrolysis unit so that the solids, including metals insoluble in molten lead and having a specific gravity less than that of the molten lead, such as nickel, cobalt, copper, iron and aluminum, will float on the top of the bath to be swept over the dam at the foot end for subsequent recovery. Metals which are soluble in the molten lead, such as zinc, tin, cadmium, lead, silver, gold and metals of the platinum group will dissolve in the molten lead and become a part of the bath from which they can be separated for recovery by well known metallurgical techniques. For this purpose, portions of the bath may be continuously or periodically removed for refinement and metal recovery. Metals and compounds which are insoluble in the molten lead and having a specific gravity higher than that of molten lead, such as tungsten and tungsten carbide, will fall to the bottom of the trough for periodical removal by suitable scrapers or other collecting means.

In addition to pyrolyzing the organic components of the solid waste, sludge or sludge residue, the pyrolysis units thus serve simultaneously to classify and to effect separation of combustible as well as non-combustible materials making up the sewage sludge and solid waste, without undesirable reaction whereby such separated material can be easily recovered in usable and commercially valuable forms.

Thermal degradation of organics during transport through the pyrolysis chamber, under the non-oxidizing conditions maintained therein, results in the generation of a large volume of vapors and gases having high BTU value. A typical analysis of gas exhausted from the pyrolysis chamber through outlet 70 includes gases, in percent by weight:

| | |
|---|---|
| CO | 25 |
| $CO_2$ | 19 |
| $H_2$ | 25 |
| $CH_2$ | 19 |
| Ethylene | 11 |
| Hydrocarbons | 1 |

The exit gases also contain large quantities of cyclic hydrocarbons such as benzene, xylene, toluene and the like by virtue of the catalytic and rapid heat transfer effects of lead and lead alloys. Typically, between 200 and 250 pounds of cyclic aromatic hydrocarbons, predominantly benzene, are produced per ton of solid waste.

A gas of the described composition will have an energy value equivalent to about 500–550 BTU per cubic foot. The BTU value can be further increased by utilizing the hot char to generate water gas by reaction with moisture thereby further to increase the CO and $H_2$ content of the gases exhausted from the pyrolysis chamber.

It will be appreciated that such gases exhausted from the chamber after scrubbing and removal of benzene and the like will be relatively clean to enable direct use as a fuel source utilized in the generation of heat and power.

As illustrated in the flow diagram, the gases exhausted from the pyrolysis unit can be used to fire the pyrolysis chamber, and such gases can be used to drive turbine generators 74 to generate power 76 while the waste heat from the turbine generator can be recycled to supplement the waste heat from the oxidation reactor to effect drying of solid waste before introduction into the pyrolysis unit. Waste heat from the pyrolysis unit can also be directed to the dryer for additional supplement of heat or otherwise utilized as a heating medium in the industrial or horticulture program.

Components of the gases, such as the lower boiling hydrocarbons, methane, ethylene and the like, provide a source of raw material for the production of methanol, ethanol or other alcohols or as raw material in the preparation of olefinic hydrocarbons, such as ethylene, propylene, butadiene and the like, in the manufacture of polymers and copolymers such as polyethylene, polypropylene and butadiene rubbers.

The benzene, xylene, toluene and the like may be further refined by well known petrochemical refining processes for use directly or as starting material for the synthesis of cyclic containing organic compounds.

The hot char, which is generated under the described pyrolytic conditions, represents a semi-activated carbon that is easily separated from the residue of the pyrolysis reaction for utilization in the system as a filter aid, as in the original filtration of the digester sludge and in the original filtration of the effluent from the wet oxidation reactor.

As illustrated in the flow diagram, the solids removed from the surface of the lead bath in the pyrolysis chamber contain the activated char, metals that are insoluble in the molten lead and of a specific gravity less than that of the molten lead, and a relatively large amount of sand, glass, dirt and the like. This mixture, identified by the numeral 78, is in a form which permits easy separation as by froth flotation 80 wherein the char 82 is carried off, leaving the higher density materials such as sand and metals for subsequent separation. The separated semi-activated carbon finds widespread industrial use but it is preferred to recycle all or a major portion of the excess char to the wet oxidation process for a filter aid to thicken sludge and as a catalytic agent to improve the process efficacy of wet oxidation.

The mixture of metal, sand, glass and dirt can be further processed for separation by magnetic and gravity techniques. Magnetic separation can be employed for removal of the iron components from the sand and the rest of the metals can be processed by gravity means or solution techniques for recovery and for separation of one metal from another in a relatively purified and usable form. Iron and aluminum, separated from the pyrolysis residue, can be used to cement out some of the more valuable metals such as silver, cadmium and gold from the liquid phase effluent of the oxidation reactor and from the metal leached from the said fraction of the char-metal-sand discharge from the pyrolysis unit.

Removal of residual metal from the sand 84 for purification to make the sand suitable for safe, environmentally acceptable discharge or use in commerce, can be achieved by treatment with acids such as sulfuric acid, hydrochloric acid, ferric chloride, brine, sulfurous acid and the like, followed by washing to leach out the metallic impurities and to provide a purified sand 86.

The filtrate from the wet oxidation reactor can be combined with the acid leach for joinder of the metallic components in an acidic medium which, upon treatment by addition of various reactants, precipitate various compounds of commercial value depending somewhat upon the acids used in the leaching operation and the materials which are incorporated to effect metal removal from the material 88. For example, valuable metal sulfides 90 may be precipitated by the addition of sodium sulfide, hydrogen sulfide, or other sulfide ions. Instead of, or in addition to, the preparation of metal sulfide, the metals in solution can be stripped with ammonia as at 92 at a pH of 10.5 to produce a number of other valuable products such as ammonium phosphate and ammonium sulfate 96, and the like, depending somewhat upon the dissolved salts present and the choice of either phosphoric or sulfuric acid used to readsorb and react with the evolved ammonia.

As a further explanation of the gas purification process from the pyrolysis unit 52, the gas evolved during the pyrolysis reaction is conducted through line 53 to a scrubber 54 of any conventional type designed for water scrubbing and cooling a gas containing particulate material, soluble and insoluble organic compounds. The purpose of this scrubber is to cool the exit gas, remove the carbon particles entrained in the gas and adsorb any soluble inorganic compounds such as $H_2S$, $SO_2$, HCl and the like. The scrubbing liquor is circulated via a filter 58 and recycled back to the scrubber. The excess water produced by virtue of the residual moisture in the solid waste and that formed by the chemical reactions during pyrolysis together with the carbonaceous residue are recycled to the wet oxidation autoclave for safe destruction.

The gas stream after water scrubbing is further purified by a second oil scrubber 55. The purpose of the oil scrubber is to remove the valuable cyclic organic compounds such as benzene, xylene, toluene and the like for further refining. The light oil utilized for the absorption of the cyclic hydrocarbons is conducted through line 56 to a distillation column for removal of the valuable benzene, xylene and toluene. The light oil, after stripping, is recycled to the oil scrubber for reuse.

The purified gas is conducted through line 57 to a suitable prime mover such as a turbine or internal combustion engine for the generation of power to be used in-plant for its operation. Waste heat of combustion is joined with that produced in wet oxidation for use elsewhere in the system.

A third contiguous part of the process involves the utilization of the nutrient value of the purified solution from the wet oxidation of sewage sludge for the growth of plants such as vegetables, flowers or other horticulture stock within a greenhouse or growth chamber by the technique generally known as hydroponics. This solution 99, in addition to the presence of ammonia, potassium and phosphorus, contains other trace elements such as boron, iron, etc., necessary for plant growth. As required, and by variation in the metal removal process 88, the necessary trace element nutrients can be provided by adjusting the ratio of solution sent to he metal removal circuit.

Excess heat generated in the wet oxidation process, pyrolysis process, cooling water for compressors, seals, pumps and the like, is provided to maintain the desired optimum temperature in the greenhouse or growth chamber. The preferred mode of transfer of energy is in the form of circulating hot water at the required temperature, depending on the thermal requirements of the area.

Steam necessary for soil sterilization in hydroponic horticulture is provided as required by the heat exchangers from line 26.

Carbon dioxide from the wet oxidation process line 37 is conducted to the greenhouse to increase the carbon dioxide content of the enclosed atmosphere to approximately 0.2%, depending on the species of plant grown to enhance their growth rate.

Purified sand residue after metals separation may be used as a suitable growth media within the greenhouse. This fraction may also contain the glass particles present in the solid waste. Alternately, the glass may be removed for sale, if a market for recycled glass exists.

I claim:

1. Resource recovery method for use in the treatment of collected sewage sludge dissolved or dispersed in aqueous medium and municipal solid waste comprising the combination of steps of subjecting at least a portion of the sewage sludge to exothermic wet oxidation by introduction of the aqueous medium into an enclosed space at a temperature within the range of 150°–450° C and pressure within the range of 300–3000 psi, said portion being in an amount to generate heat sufficient to substantially dry the solid waste and the remainder of the sewage sludge, introducing oxygen containing gas into the aqueous medium to cause oxidation of said sewage sludge contained in the aqueous medium until 10–95% reduction in COD is achieved, subjecting the wet oxidation reaction products to separation into a solid phase and a liquid phase, heating the solid waste and any remainder of said sewage sludge with heat derived from the exothermic wet oxidation of the sewage sludge, flowing a stream of molten lead in one direction from a head end to a foot end within a pyrolysis chamber, depositing the heated solid waste and remainder of the sewage sludge plus the solid phase from the wet oxidation onto the stream of molten lead at the heat end portion to form a layer thereon, maintaining non-oxidizing conditions in the pyrolysis chamber whereby during travel with the stream of molten lead from the head end to the foot end, organic components of the material fed onto the stream of molten lead are thermally decomposed to gases and vapors and a carbonaceous component containing char, while metals and inorganic materials, including silica and sand, which are insoluble in molten lead and of a lower specific gravity remain on the surface of the stream of molten lead, metals and inorganic materials which are soluble in molten lead dissolve in the molten lead to become a part of the stream, and metals and materials insoluble in molten lead and of a higher specific gravity fall to the bottom of the stream, removing said gases and vapors from said pyrolysis chamber, and separating the char, metals, and inorganic materials from said stream of molten lead.

2. The method as claimed in claim 1 which includes the step of subjecting a portion of the sewage sludge to be processed through the wet oxidation reaction to microbiological treatment.

3. The method as claimed in claim 1 in which the COD is reduced by an amount within the range of 50–85%.

4. The method as claimed in claim 1 which includes the step of reducing the solid waste to finely divided form before introduction with the solid phase from the wet oxidation reaction into the pyrolysis chamber.

5. The method as claimed in claim 4 in which the solid waste is reduced to finely divided form by shredding.

6. The method as claimed in claim 1 in which the amount of heat generated by combustion of organic matter during the wet oxidation is sufficient to make the wet oxidation reaction self-sufficient without the introduction of heat.

7. The method as claimed in claim 1 in which the hot gases and vapors separated from the wet oxidation reaction are passed in heat exchange directly or indirectly through a heat exchange medium with the solid waste to effect moisture removal.

8. The method as claimed in claim 1 in which the hot gases and vapors from the wet oxidation contain a grease phase and which includes the step of condensing the grease phase from the hot gases and vapors, and passing the condensed grease to the pyrolysis reaction.

9. The method as claimed in claim 1 which includes the step of extracting energy from the gaseous-vapor phase separated from the pyrolysis unit.

10. The method as claimed in claim 1 which includes the step of combining steam with the hot carbonaceous material in the pyrolysis chamber to generate water gas.

11. The method as claimed in claim 1 which includes the step of processing the hot gases and vapors from the pyrolysis chamber through a turbine for the generation of power.

12. The method as claimed in claim 11 which includes the step of recovering heat from the gases and vapors processed through the turbine for other heating operations.

13. The method as claimed in claim 1 which includes the step of separating the gaseous phase from within the pyrolysis chamber and making the gases and vapors available as a fuel sorce.

14. The method as claimed in claim 13 in which the gases and vapors exhausted from the pyrolysis unit contain methanol, ethanol and other alcohols as a source of raw material in chemical synthesis.

15. The method as claimed in claim 13 in which the gases and vapors exhausted from the pyrolysis unit contain hydrocarbons including benzene, xylene and toluene as a fuel source or as a source of chemical reactants.

16. The method as claimed in claim 15 in which the gas exhausted from the pyrolysis unit is subjected to scrubbing in an oil scrubber for removal of cyclic hydrocarbons including benzene, xylene and toluene.

17. The method as claimed in claim 11 comprising passing the hot gases including at least one of the gases from the pyrolysis chamber and the waste gases from the turbine in heat exchange relation with the solid waste to effect the removal of moisture and to preheat the dried solid waste.

18. The method as claimed in claim 1 which includes the step of removing the solids from the surface of the stream of molten lead at the foot end.

19. The method as claimed in claim 1 which includes the step of cementing out metals dissolved in the molten lead.

20. The method as claimed in claim 1 which includes the step of stripping the liquid phase from the wet oxidation reaction with ammonia to precipitate ammonium salts.

21. The method as claimed in claim 20 in which the ammonium salts precipitated from the liquid phase includes ammonium phosphate and ammonium sulfate.

22. The method as claimed in claim 1 which includes the step of adding a soluble sulfide to the liquid phase from the wet oxidation reaction to precipitate metal sulfides.

23. The method as claimed in claim 1 in which the liquid phase from the wet oxidation reaction is employed as a hydroponic liquid for plant growth.

* * * * *